(12) United States Patent
Ceponkus et al.

(10) Patent No.: US 9,477,392 B2
(45) Date of Patent: Oct. 25, 2016

(54) PRESENTATION OF TABULAR INFORMATION

(75) Inventors: Alexander Vitas Ceponkus, Ancaster (CA); Xiya Ouyang, Scarborough (CA)

(73) Assignee: BlackBerry Limited, Waterloo, Ontario (CA)

( * ) Notice: Subject to any disclaimer, the term of this patent is extended or adjusted under 35 U.S.C. 154(b) by 547 days.

(21) Appl. No.: 13/527,993

(22) Filed: Jun. 20, 2012

(65) Prior Publication Data

US 2012/0324329 A1  Dec. 20, 2012

Related U.S. Application Data

(60) Provisional application No. 61/498,747, filed on Jun. 20, 2011.

(51) Int. Cl.
*G06F 17/24* (2006.01)
*G06F 3/0485* (2013.01)
*G06F 17/30* (2006.01)

(52) U.S. Cl.
CPC ........... *G06F 3/0485* (2013.01); *G06F 17/246* (2013.01); *G06F 17/247* (2013.01); *G06F 17/30595* (2013.01)

(58) Field of Classification Search
CPC .. G06F 17/211; G06F 17/246; G06F 17/247; G06F 17/243; G06F 17/245; G06F 17/2294
USPC .......... 715/212, 243–246, 252, 238
See application file for complete search history.

(56) References Cited

U.S. PATENT DOCUMENTS

| | | | |
|---|---|---|---|
| 6,239,799 B1* | 5/2001 | Owings | G06F 8/38 715/786 |
| 6,313,848 B1* | 11/2001 | Hoag | 345/684 |
| 7,200,615 B2* | 4/2007 | Eschbach et al. | 715/781 |
| 8,429,521 B2* | 4/2013 | Lloyd et al. | 715/234 |
| 9,009,583 B2* | 4/2015 | Shearer et al. | 715/212 |

(Continued)

FOREIGN PATENT DOCUMENTS

EP  1909192  4/2008

OTHER PUBLICATIONS

"The Columns of a Spreadsheet", retrieved from https://web.archive.org/web/20100301091201/http://www.functionx.com/excel/Lesson02.htm.*

(Continued)

*Primary Examiner* — Stephen Hong
*Assistant Examiner* — Sanchita Roy
(74) *Attorney, Agent, or Firm* — Jeffrey N. Giunta; Fleit Gibbons Gutman Bongini & Bianco P.L.

(57) ABSTRACT

An apparatus and method of presenting tabular data. A list of received data tables is displayed allowing a user to select a table. In response to selecting a table, a significant column for the selected table is presented so as to span across parallel edges of a display. A divider bar is displayed along a first edge of the display. An input indicating movement perpendicular to the first edge of the divider bar to a new position between the edges of the display is received. The significant column presentation is modified in response to the input by visually compressing the significant column between an edge opposite the first edge and the new position. Additional data from the selected data table is presented between the new position and the first edge in rows that are aligned with corresponding rows of the significant column.

19 Claims, 6 Drawing Sheets

(56) References Cited

U.S. PATENT DOCUMENTS

| | | | |
|---|---|---|---|
| 9,035,949 B1* | 5/2015 | Oberheu | G06F 1/00 345/440 |
| 2002/0013165 A1 | 1/2002 | Ostergaard | |
| 2003/0122880 A1 | 7/2003 | Kloppmann et al. | |
| 2006/0020903 A1* | 1/2006 | Wang | G06F 3/0481 715/792 |
| 2006/0129913 A1* | 6/2006 | Vigesaa et al. | 715/503 |
| 2007/0067710 A1 | 3/2007 | Clark et al. | |
| 2007/0079230 A1* | 4/2007 | Vignet | 715/504 |
| 2009/0183068 A1* | 7/2009 | Bard | G06F 17/30905 715/252 |
| 2009/0313537 A1 | 12/2009 | Fu et al. | |
| 2010/0241989 A1 | 9/2010 | Wen | |
| 2011/0163968 A1* | 7/2011 | Hogan | 345/173 |
| 2012/0013539 A1* | 1/2012 | Hogan | G06F 3/04883 345/173 |
| 2014/0223381 A1* | 8/2014 | Huang et al. | 715/863 |

OTHER PUBLICATIONS

EESR dated Oct. 19, 2012 for European Patent Application No. 12172800.

O'Reillypub: "Chapter 6, Viewing and Printing Worksheets," Excel: The Missing Manual, O'Reilly, US, Dec. 1, 2004, pp. 1-7, XP007901558.

"Moving Split Bar in a Customized Details View," IBM Technical Disclosure Bulletin, International Business Machines Corp. Thornwood), US, vol. 34, No. 7A, Dec. 1, 1991, pp. 426-428, XP000255654, ISSN: 0018-8689.

* cited by examiner

PRESENTATION OF TABULAR INFORMATION

CROSS-REFERENCE TO RELATED APPLICATIONS

This application is based upon and claims priority to U.S. Provisional Patent Application Ser. No. 61/498,747 filed Jun. 20, 2011 the disclosure of which is hereby incorporated by reference in its entirety.

FIELD OF THE DISCLOSURE

The present disclosure generally relates to data processing user interfaces and more particularly to presentation of tabular data on a user interface.

BACKGROUND

Many automated data processing systems and information display applications present two dimensional tabular data to a user. Example of such two dimensional tabular data are spreadsheets, personnel lists, and other tabular data storage applications such as relational databases. In desktop applications, display screen area is not generally a constraint and sufficient portions of a table are able to be presented to a user to allow a user to see significant portions of the table at one time. Applications operating with a small display screen, such as in a mobile environment, generally have constrained display screen area that limits the amount of tabular data that can be presented to a user at one time.

Therefore, the ability of electronic devices with small display screens to effectively present tabular data for a user to comprehend context is affected by the arrangement and selection of data for display.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

Figure 1:
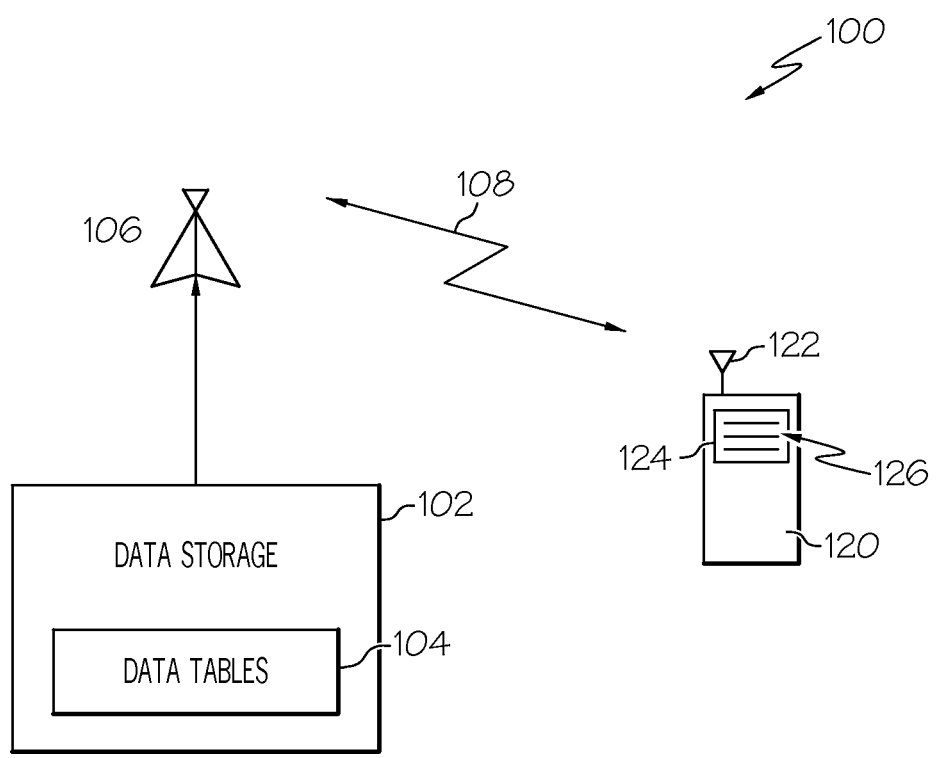
FIG. 1 depicts a wireless communications scenario according to one example.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function FIG. 1 depicts a wireless communications scenario 100 according to one example. The wireless communications scenario 100 depicts an example of transferring data from a data storage 102 to a wireless communications device 120. In this example, the data storage 102 stores data such as data tables 104. The data tables 104 include one or more data sets that represent two dimensional data. The data within the two dimensional data are able to be presented to the user in a row and column format in order to facilitate visualizing the relationships between and among the data items within a particular data table.

Data tables are often presented in a format similar to common spreadsheets. Each column of a data table typically contains a certain type of data item. An example of a data table includes an address book that lists a person's name in a "name" column and has other columns that each contains other categories of information. In the example of an address book data table, separate columns each store addresses, phone numbers, email addresses, and other information that are associated with individuals listed in the "name" column. In this example, each person is assigned one row in the address book data table with that person's name in a prominent column, such as a leftmost column, and other data associated with that person is contained on that same row in other columns.

The data tables 104 stored in the data storage 102 typically have one column of information that is more significant in identifying rows of the table that are of interest to a user. In the address book example above, the "name" column is generally important to a user because a user generally seeks contact information for a particular individual. In the following discussion, the column that is more significant in identifying rows of interest is referred to as a "significant column."

In one example, the data tables 104 contain data tables associated with Microsoft SharePoint® projects. Data tables associated with Microsoft SharePoint® projects typically, but not always, specify a significant column. Further data tables, such as address book data tables or other tabular data are also able to have a particular column that, for example, a user might examine first to identify further data of interest.

In the wireless communications scenario 100, one or more data tables from the data tables 104 are transmitted through a base station 106 over a wireless communications signal 108 to the wireless communications device 120. The antenna 122 of the wireless communications device 120 receives the wireless communications signal 108 and extracts the one or more data tables that were transferred from the data storage 102. One or more presentations of data contained in the data tables is presented as an image 126 on a display 124 of the wireless communications device 120.

Figure 2:
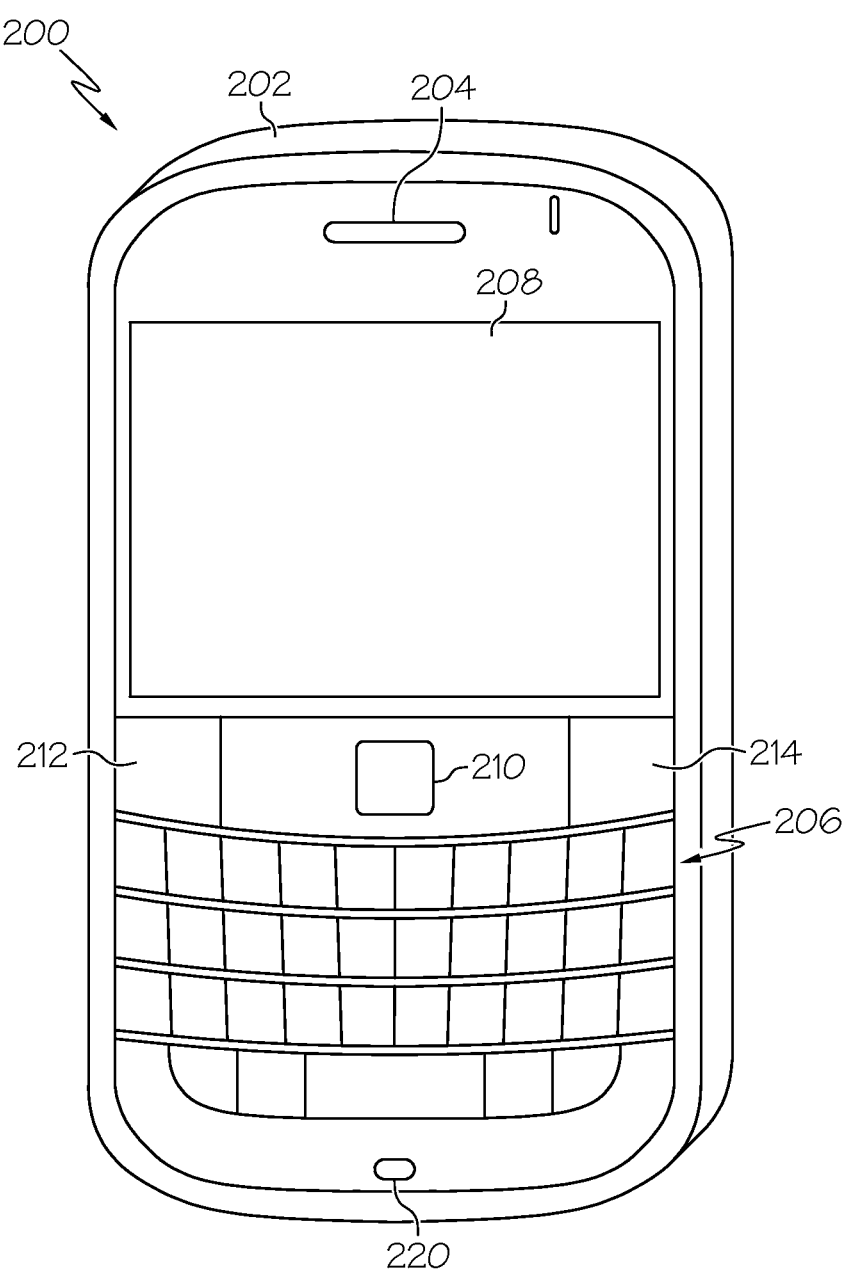
FIG. 2 is an example handheld communications device according to one example.

FIG. 2 is an example handheld communications device 200, according to one example. The example handheld communications device 200 shows a portable electronic device 202, such as a Personal Digital Assistant (PDA), a smart-phone, a cellular telephone, a tablet computer, or any other type of portable electronic device. In general, a handheld device refers to any device that is sized, shaped and designed to be held or carried in a human hand. The portable electronic device 202 includes a wireless communications subsystem, described below, that is able to exchange voice and data signals. In one example, the wireless communications subsystem is able to receive a wireless signal conveying data tables to be displayed by the portable electronic device.

The portable electronic device 202 includes an earpiece speaker 204 that is used to generate output audio to a user engaged in, for example, a telephone call. A microphone 220 is able to receive audible signals, such as a user's voice, and produce an electrical signal representing the audible signal. The portable electronic device 202 further includes a keyboard 206 that allows a user to enter alpha numeric data for use by, for example, application programs executing on the portable electronic device.

The portable electronic device 202 has a display 208. The display 208 depicted in FIG. 2 is a graphical alpha numeric display capable of displaying various images to a user. The display 208 in one example is a touchscreen user interface device that allows a user to touch the screen of the display 208 to select items and to perform gestures, such as swiping a finger across the screen of the display 208, to provide a user interface input to an application program operating on the portable electronic device 202. In response to a user's gesture, such as swiping, or moving, a finger touching the screen of the display 208 across the screen, the display 208 receives a user interface input that is associated with the gesture performed by the user.

The portable electronic device 202 further has a first selection button 212 and a second selection button 214. In one example, a user is able to select various functions or select various options presented on the display 208 by pressing either the first selection button 212 or the second selection button 214. In another example, the first selection button 212 and the second selection button 214 are associated with particular functions that are performed in response to pressing the respective button. The portable electronic device 202 also has a trackpad 210. Trackpad 210 is able to receive input indicating a direction or movement, a magnitude of movement, a velocity of movement, or a combination of these quantities, in response to a user moving a finger across the face of trackpad 210.

In further examples, a user is able to use various techniques to provide inputs that are received by a processor of the portable electronic device 202. For example, microphone 220 is able to receive audible voice commands uttered by a user and process those audible voice commands to create an input signal that are received by other processes to control further processing. A user is also able to use keyboard 206 to enter text based commands that a processor of the portable electronic device 202 interprets to produce inputs that are received by other processes to control further processing.

Figure 3:
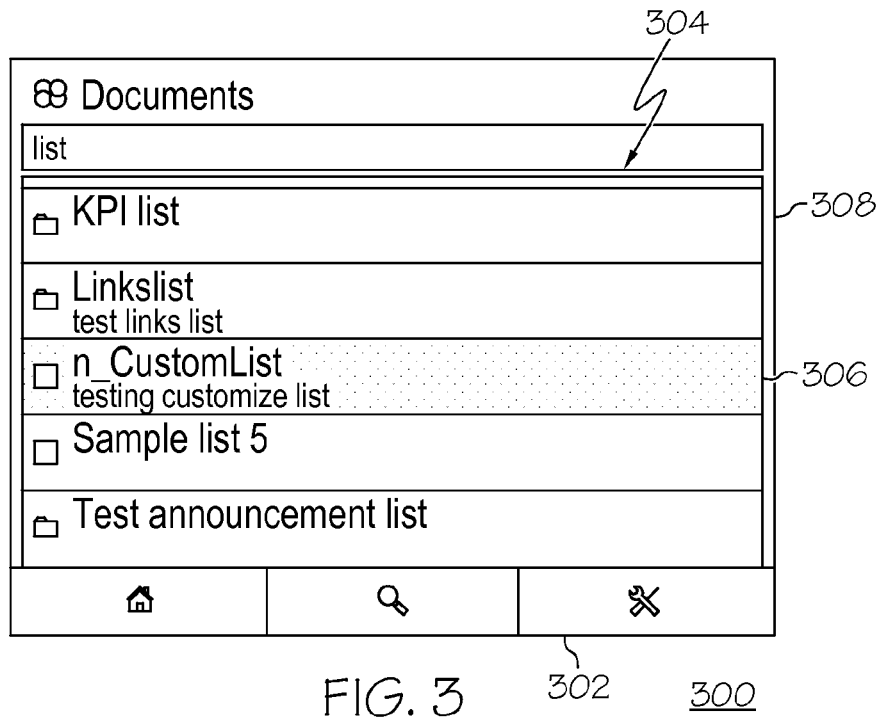
FIG. 3 illustrates a data table list, according to one example.

FIG. 3 illustrates a data table list 300, according to one example. The data table list 300 is presented on a display of a device and allows a user to provide an input to select a particular data table for further viewing. In the context of the above described wireless communications scenario 100, the wireless communications device 120 receives from the data storage 102, such as through the base station 106 and the wireless communications signal 108, one or more data tables from within the data tables 104. Once one or more data tables are received, the wireless communications device 120 presents the data table list 300 on its display 124. In an alternative example, the wireless communications device 120 receives a data set that describes data tables that are available to be sent to the wireless communications device 120, and the data table list 300 is created based upon this data set. In one particular example, the wireless communications device is the portable electronic device 202 described above with regards to FIG. 2 and the data table list 300 is presented across the entire display 208.

Figure 4:
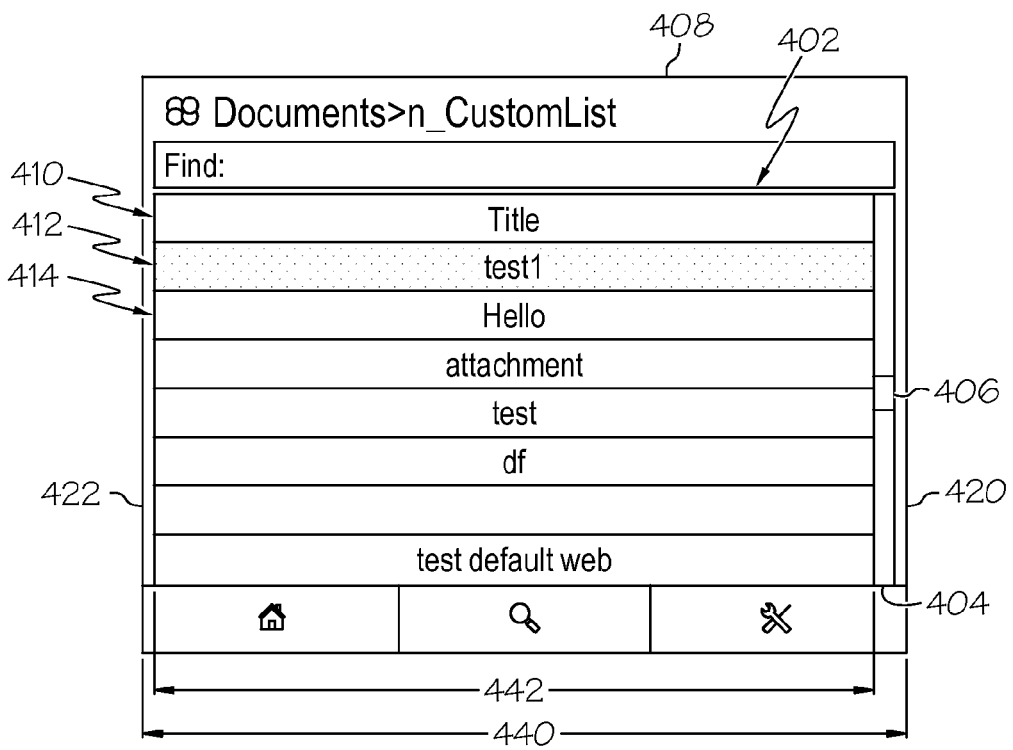
FIG. 4 illustrates a significant column display according to one example.

The data table list 300 is a display of a list of data tables that are available to be displayed on an electronic device. The data tables listed in the data table list 300 are able to be stored on a device presenting the data table list, or simply accessible to the device via a communications link. The data table list 300 includes an image 302 that depicts a number of data tables. The example data table list 300 includes a list of graphical user interface elements 304 that contains one graphical user interface element (i.e. one entry) for each data table available to the device. A "KPI list" graphical user interface element 308 represents a data table named "KPI list." An "n_CustomList" graphical user interface element 306 represents a data table named "n_CustomList." In various examples, any number of graphical user interface elements representing data tables is able to be presented for selection for viewing by a user. The image 302 is able to be scrolled to reveal further data tables that are available for viewing. In one example, once a user selects a data table from the data table list 300, a significant column for the selected data table is displayed using the full available width of a display screen to facilitate identification of data of interest in the selected data table, as shown in FIG. 4. In the example shown in FIG. 4, the significant column that is displayed is labeled "title." In various examples, the user is able to designate a column as the significant column that is to be displayed or a particular table is able to have a significant column specified through various techniques.

Returning to FIG. 3, a user of a device presenting the data table list 300 is able to provide an input to select a particular data table by selecting a graphical user interface element that corresponds to the particular data table. An input to select a graphical user interface element, such as an entry of the data table list 300, is able to be performed by any technique. For example, when the data table list 300 is presented on a touchscreen display, a user is able to select a data table by tapping, touching, or performing any defined gesture on the touchscreen display in the vicinity of the graphical user interface element corresponding to the data table the user wishes to select. User inputs to select a data table are also able to use other techniques. An example of another user input technique used to select a data is moving a cursor, such as with trackpad 210 of the handheld communications device 200 discussed above, on the display to highlight a graphical user interface element and operating a user input device to select the highlighted graphical user interface element. Examples of operations of user interface elements to select the highlighted graphical user interface element include pressing a button, such as the first selection button 212 or the second selection button 214, or other available input mechanisms. In further examples, a user is able to indicate a selection of a data table by using, for example, text based user interfaces, audible voice commands, or any other type of user interface. In the following discussion of FIGS. 4-6, it is presumed that a user has selected the "n_Custom-List" graphical user interface element 306 by tapping on a touchscreen display, such as display 208.

FIG. 4 illustrates a significant column display 400 according to one example. In the example of FIG. 4, the significant column display is labeled "Title." The significant column display 400 depicts a graphical user interface display 408 containing an initial graphical user interface presentation of a portion of contents in a data table that are presented to a user, generally a user of a small screen device such as the handheld communications device 200 described above. In further examples, the significant column display 400, and the other displays described herein, is able to be presented on any size or type of display screen that is part of or associated with any type of device. The significant column display 400 containing a significant column for a particular data table is presented in one example in response to a user selecting a graphical user interface element corresponding to that particular data table. In the context of the data table list 300 discussed above, the significant column display 400 is presented in response to the user selecting the "n_Custom-List" graphical user interface element 306 and contains a particular subset of the data contained in the data table associated with the selected data table graphical user interface element. As discussed in further detail below, the significant column display 400 presents a subset of the selected data table, usually data that has been identified as being significant in helping a user identify rows of the table that are of interest.

The significant column display 400 is shown to have a display width 440 that extends, for example, across the entire display 408, such as display 208 discussed above. In further examples, the significant column display 400 is able to be presented in a graphical user interface window of a larger display, in which case the width of the graphical user interface window is equal to the display width 440. In the illustrated example, the significant column display 400 spans from a first edge, such as the left edge 422, of the display to a second edge, such as the right edge 420, of the display. The significant column display 400 is an example of presenting a first image, which is an image displaying the significant column 402, that spans from the first edge of a display to the second edge of the display. In this example, the first edge, i.e., the left edge 422, is parallel to and opposite the second edge, i.e., the right edge 420.

In the following discussion, the directional terms "vertical" and "horizontal" are used to describe directions depicted in the figures being described in order to clearly and more simply describe the features being depicted. In a broader sense, features described by the terms vertical or horizontal in this description should be understood to describe any direction that is not restricted to being vertical and horizontal. In this description, features described as horizontal are substantially perpendicular to features described as vertical, and further examples are able to operate similarly by having perpendicular features with any absolute orientation. Further, features described as vertical and horizontal are able to be substantially perpendicular to each other, such that although these features may be oriented at other than right angles from each other, their interaction behaves as though these features have orthogonal orientations.

Looking across the significant column display 400 in a horizontal direction, a significant column 402 and a divider bar 404 are presented in the significant column display 400. The divider bar 404 is discussed in further detail below. The significant column 402 is presented as an image with a single column that extends, along with the divider bar 404, across the available width of the display 408. As discussed above, the significant column 402 is one column of data contained in a data table. In several examples, the significant column 402 is specified by data within the data table itself, is specified by extrinsic data, is determined for the data table, or is determined based upon combinations of these techniques. The significant column 402 is generally a column that is significant in identifying rows of the table that are of interest to a user. Presenting the significant column 402 as a single column that consumes almost the entire display width 440 of the display 408 allows presenting a display image of the significant column data that is more complete, more easily readable, or both.

The significant column 402 is shown to have a number of rows. The first row of the illustrated example is a title row 410 that specifies the name, which is "title," that is assigned to the significant column for this table. In this example, the title row 410 contains text stored as the top row of the significant column 402 in the data table. In another example, a data table containing information of an address book may have a significant column labeled with the text "Name" in its top row. The significant column 402 further contains a first significant column row 412 that contains the text "test1" and a second significant column row 414 that contains the text "Hello." The first significant column row 412 and the second significant column row 414 are depicted as beneath the title row 410. In general, the contents of the rows displayed in the significant column 402 allows a user to identify which rows of a data table the user is interested in examining further. The illustrated significant column display 400 depicts an initial set of rows that includes eight (8) rows of data within the significant column of the selected data table. The significant column display 400 in this example presents a first image that includes data within an initial plurality of rows of a significant column of a selected data table.

The contents of the significant column display 400 are able to be vertically scrolled up, down, or up and down in order to see data contained in other rows of the significant column 402 that are beyond those displayed in a particular image of the significant column display 400. In the following discussion, scrolling in a direction that causes the display of different rows of one or more columns in a table, which generally corresponds to vertical scrolling in the depicted figures, is referred to as "row scrolling." In one example, the title row 410 is not vertically scrolled and is displayed at the top of the significant column 402 regardless of the vertical scrolling position of the other displayed rows of the significant column 402. For example, the title row 410 is the first row of the significant column, but the presently displayed first significant column row 412 and the second significant column row 414 are able to be any consecutive rows within the significant column 402 of the data table being displayed. By scrolling through what is generally a long list of the significant column entries, a user is able to more easily find entries of interest in the data table being displayed.

A divider bar 404 is shown along the right edge 420 of the display 408. The divider bar 404 is a graphical user interface element that allows a user to alter the graphical user interface image presented on the display 408. As described in detail below, a user in one example is able to provide a graphical user interface input to move the divider bar 404 horizontally across the display 408 towards a left edge 422 of the display 408 in order to display additional contents of the data table that contains the significant column 402. In general, the user is able to provide a user interface input that indicates moving the divider bar in a first direction that has a component that is substantially perpendicular to the direction of the right edge 420. To aid a user in providing the graphical user interface input, a divider bar handle 406 is displayed as part of the divider bar 404. In various examples, gestures are interpreted as inputs indicating horizontal movement of the divider bar if a stylus or finger is touching the divider bar handle 406.

Figure 5:
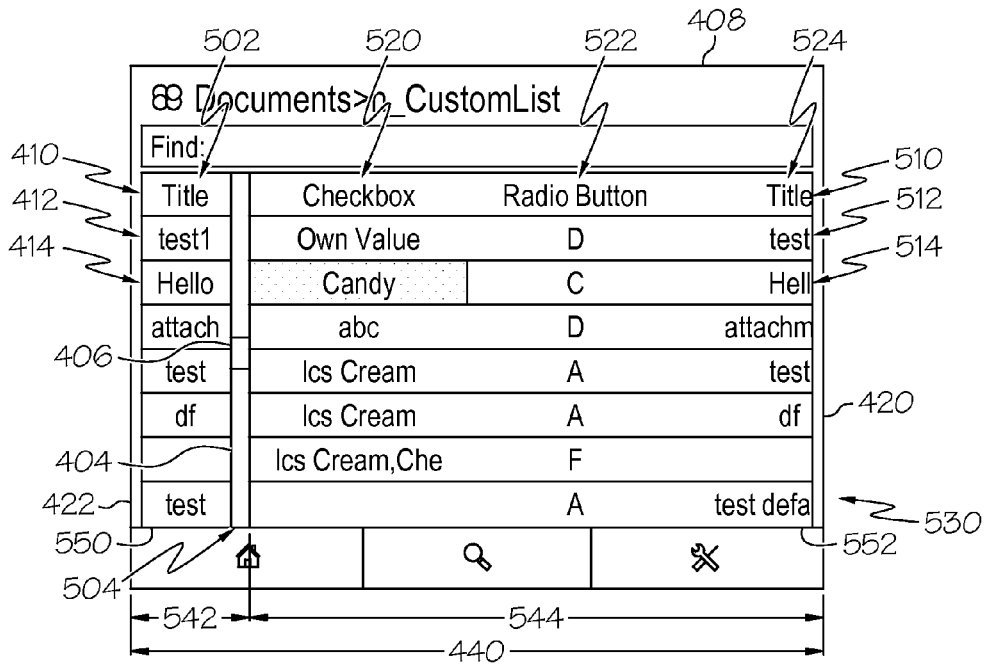
FIG. 5 illustrates a combined display according to one example.

FIG. 5 illustrates a combined display 500 according to one example. The combined display 500 is presented in a response to a user's providing a graphical user interface input to the significant column display 400. With reference to FIG. 4, a user is able to place a finger on the divider bar handle 406 and move the finger from the right edge 420 towards the left edge 422. The user is able to stop the finger movement, or simply lift the finger from the touchscreen display 408, at a new divider position 504. In general, the new divider position 504 is an arbitrary position between the right edge 420 and the left edge 422 of the display 408. The divider bar 404 then stops at the new divider position 504. In alternative examples, a user is able to provide different inputs to cause the divider bar 404 to move to a specified or arbitrary new divider position such as by pressing arrow keys, pressing a key within a group of one or more keys that each define a different new divider position location, or by any technique. In one example, the new divider position 504 is a defined location where the divider bar 404 is positioned whenever a user input is received that indicates horizontal movement of the divider bar 404. The above described user interface operations are examples of a user interface movement input that indicates movement of the divider bar from the first edge, e.g., the right edge 420, to the new divider position, where the movement has a component in a direction that is perpendicular to the first edge, which is the right edge 420 in this example. In one example, the divider bar 406 was drawn on right edge 420 of the significant column display 400 prior to receiving the user interface movement input.

The above described user interface movement of the divider bar that is indicated by a user interface movement input is not itself required to be perpendicular to the right edge 420. A user interface movement is able to be at any angle relative to the right edge 420 that has some component that extends perpendicularly from the right edge 420.

The illustrated divider bar 404 located at the new divider position 504 defines two portions of the display 408. A left portion 550 has a left portion width 542 and is between the new divider position 504 and the left edge 422. A right portion 552 has a right portion width 544 and is between the new divider position 504 and the right edge 420. The sum of the left portion width 542, the right portion width 544, and the width of the divider bar 404 equals the entire display width 440. In this example, the sum of the left portion width 542 and the right portion width 544 equals the significant column width 442 discussed above.

In response to a user providing a graphical user interface input to move the divider bar from the right edge 420 to the new divider position 504, a processor, discussed below, controlling the presentation of images on the display 408 receives that input and modifies the images presented on the display 408 from the image presented for the significant column display 400 to the image presented for the combined display 500. In one example, the significant column 402 of the significant column display 400 is modified to create a second image that is a visually compressed presentation of the data presented in the significant column 402, where the second image is created by visually compressing the first image along a first direction that is perpendicular to the first edge, which is the right edge 420. The second image therefore presents a compressed significant column 502 that has a width equal to the left portion width 542. Further in response to receiving that user interface input, additional data 530 that is contained in the table from which the significant column 402 is obtained is presented in the right portion 552.

The visual compression of the significant column 402 is able to be performed by any image manipulation that reduces the displayed size of the significant column 402 along the first dimension that is perpendicular to the right edge 420. For example, font sizes of displayed text are able to be reduced, blank space that is located before, after, or between text elements is able to be reduced in horizontal size or removed, or any combinations of these techniques may be used to, as depicted in the illustrated example, horizontally compress the presented image of the significant column 402 to obtain the compressed significant column 502.

The additional data 530 presented in the right portion 552 in this example are columns of data defining an initial additional column set that are also contained in the data table from which data in the significant column 402 is obtained. In this example, the rows of data table presented in the additional data 530 are in alignment with corresponding rows of data contained in the compressed significant column 502. Aligning the rows of data displayed for the additional data 530 with the rows of data displayed in the compressed significant column 502 in the context of the illustrated example refers to the relationship whereby rows of the data displayed in the compressed significant column 502 are vertically aligned with data in the same, or corresponding, rows of different columns that is displayed in the additional data 530.

Aligning the rows of data displayed for the additional data 530 with the rows of data displayed in the compressed significant column 502 allows a user to easily identify rows of interests by examining data presented in the compressed significant column 502 and viewing that data of interest in the same row of the additional data 530. In the illustrated example, the additional data 530 is an additional presentation that is between the new divider position 504 and the right, or first, edge 420. This additional presentation depicts data stored in the initial plurality of rows of a first additional column set, where the initial plurality of rows is the rows presented in the significant column 402. The rows of the first additional column set of the additional data 530 presented in the right portion 552 are in vertical alignment with corresponding rows of the significant column 502.

Referring to the example combined display 500, the data presented in the right portion 552 is able to be scrolled horizontally, vertically, or horizontally and vertically according to the illustrated directions. When scrolled vertically, the rows of displayed data in the significant column 502 are scrolled by a corresponding amount to maintain alignment between the rows displayed in the compressed significant column 502 and the additional data 530. In one example, a processor receives a row scrolling command, which indicates scrolling in the vertical direction in the illustrated example, and presents, based upon the row scrolling command, a scrolled second image in the left portion 550 that is between the second, or left, edge 422 and the new divider position 504. The scrolled second image includes a second plurality of rows of the significant column of the selected data table where the second plurality of rows is different than the initial plurality of rows and are selected based upon the row scrolling command. The display processor also presents, based on the row scrolling command, a modified additional presentation in the right portion 552 that is between the new divider position 504 and the first, or right, edge 420. The modified additional presentation depicts data stored in the second plurality of rows of the first additional column set of the selected data table where the additional presentation presents the second plurality of rows in vertical alignment with corresponding rows of the significant column.

The data presented in the right portion 552 is also able to be scrolled in one example in response to receiving a column scrolling command, which is a command in this example to perform horizontal scrolling of the additional data 530. Examples of user actions that that cause a column scrolling command to be received by a processor include a swipe gesture and a swipe gesture made in the right portion 552 that is between the new divider position 504 and the first, or right, edge 420. In one example, a display processor, based on a received column scrolling command, presents a modified additional presentation in the right portion 552 that is between the new divider position 504 and the first, or right, edge 420. The presented modified additional presentation depicts data stored in a second additional column set of the initial plurality of rows of the selected data table, the modified additional presentation presenting the initial plurality of rows in vertical alignment with corresponding rows of the significant column, the second additional column set being selected based upon the column scrolling command and being different than the first additional column set.

The additional data 530 includes a heading row 510. The heading row 510 contains title names associated with each column of the additional data 530 presented in the right portion 552. In the illustrated additional data 530, three columns are shown. A first additional column 520 has a title "Checkbox," a second additional column 522 has a title "Radio Button," and a third additional column 524 has a partially presented title that reads "Titl." In this example, the third additional column 524 happens to also be the significant column presented in the significant column 502. As the additional data 530 is horizontally scrolled within the right portion 552, the contents of all rows, including the heading row 510, are scrolled with each other to maintain the columnar relationship for the displayed data. As the additional data 530 is vertically scrolled within the right portion 552, the contents of the heading row 510 is not scrolled, but the contents of the other rows of the additional data 530 are vertically scrolled along with the rows of the compressed significant column 502 that are below the title row 410.

The combined display 500 shows a number of rows below the heading row 510. A first row 512 and a second row 514 are depicted containing data corresponding to the labels of the corresponding rows of the compressed significant column 502. For example, the first row 512 has data associated with a title "test1" as defined by the compressed significant column 502. The displayed data for the first row 512 depicts "checkbox" data equal to "Own Value" and "Radio Button" data equal to "D" for the "test1" title row defined by the corresponding row of the compressed significant column 502. The displayed data for the second row 514 depicts "checkbox" data equal to "Candy" and "Radio Button" data equal to "C" for the "Hello" title row defined by the corresponding row of the compressed significant column 502.

Figure 6:
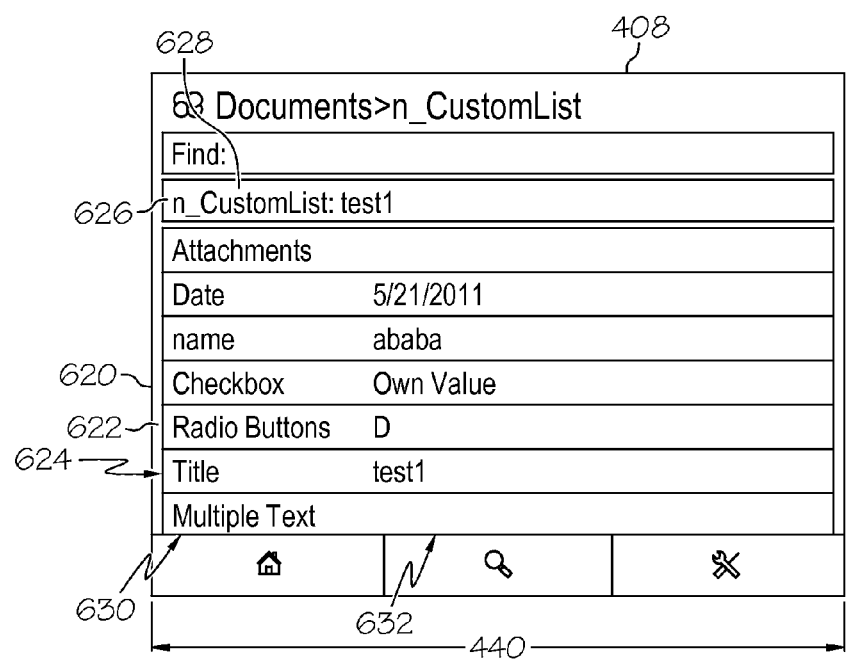
FIG. 6 illustrates a selected row display according to one example.

FIG. 6 illustrates a selected row display 600 according to one example. The selected row display 600 of this example presents data within the first row 512 of the combined display 500, discussed above. The selected row display 600 is presented to a user in one example by a user providing an input to select a row of the data table presented through either the significant column display 400 or the combined display 500. In one example, a user pressing the display 408 in a location at which a particular row of information is display operates to select that row of information. In response to this input, the processor controlling the images presented on the display 408 causes the data contained in that row to be presented in a vertical manner, as illustrated by the selected row display 600. Further examples are able to present the data contained in a selected row in any desired manner, layout, or with any other desired attributes.

The selected row display 600 is shown to consume the display width 440. In this example, there is no divider bar. A user is able to, however, vertically scroll through the presented data to reveal further data elements contained within the selected row. Each row of the selected row display contains a title field 630 and a data field 632. The data contained in the title field 430 corresponds to the data contained in the header row 510 for the column represented by that row of the selected row display. The data field 632 contains the data element within the selected row. In the illustrated example, the first row 512 is selected and data from that row is presented in the selected row display 600. With reference to the illustration of FIG. 5, the data of the selected row in the first additional column 520 corresponds to the data in a Checkbox row 620 of the selected row display 600. The data of the selected row in the second additional column 522 corresponds to the data in a Radio Button row 622 of the selected row display 600. The data of the selected row in the third additional column 524 corresponds to the data in a Title row 624 of the selected row display 600. As discussed above, the third additional column 524 is designated as the significant column and contains the data that is also presented in the compressed significant column 502. The data of the selected row that is displayed in the compressed significant column 502 is also displayed in an identifier row 626. The identifier row 626 contains a table name 628 along with data that is contained in the first significant column row 412.

Figure 7:
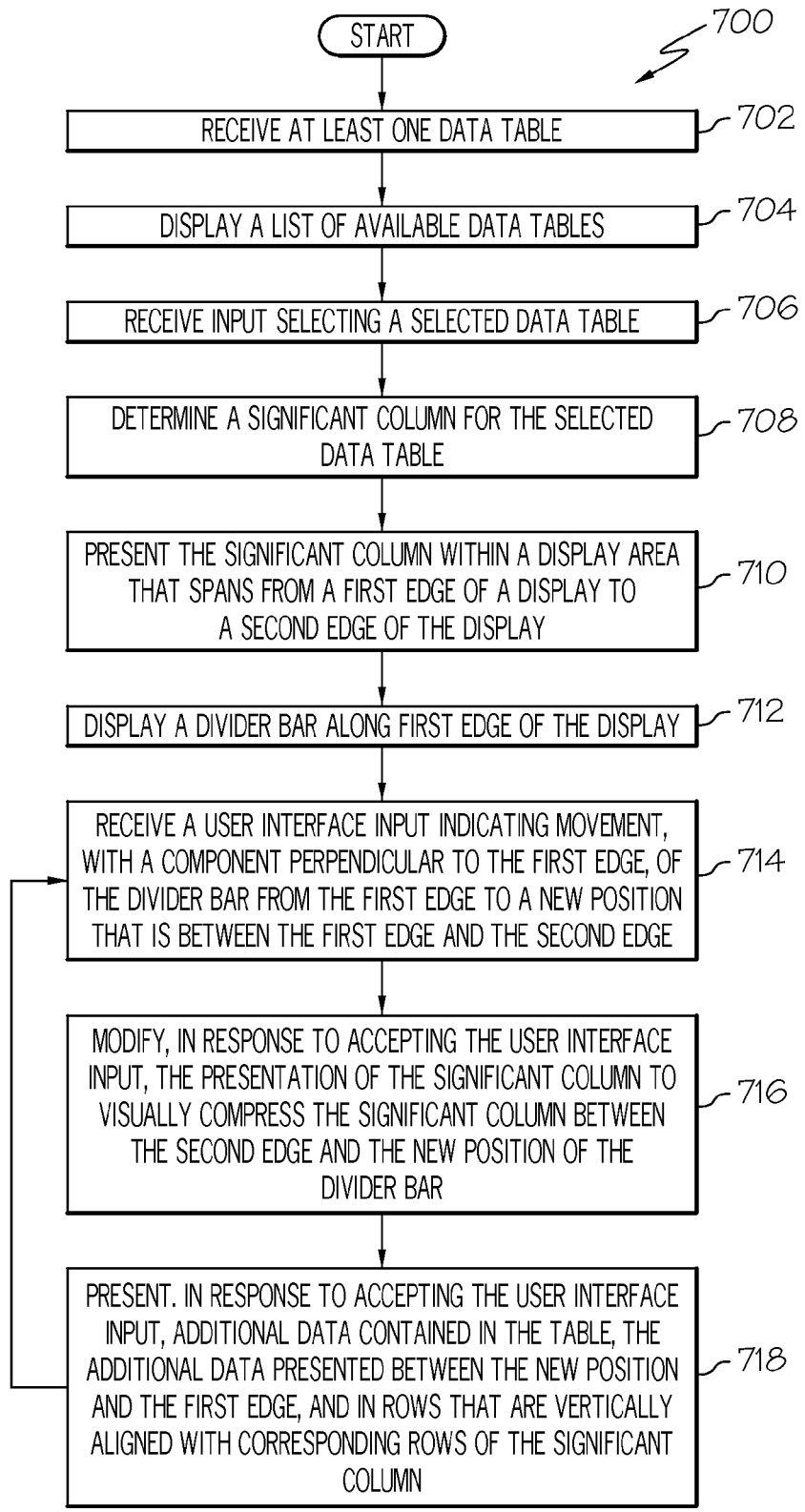
FIG. 7 illustrates a display transition process according to one example.

FIG. 7 illustrates a display transition process 700, according to one example. The display transition process 700 is one example of a process that is performed to transition from the data table list 300 to the significant column display 400 and then from the significant column display 400 to the combined display 500, each of which are described above. The display transition process 700 depicts one example of a process to transition between these displays, where these transitions are performed in response to receiving a graphical user interface input. A user interface input that indicates selecting a particular data table from the data table list 300 causes the transition to the significant column display 400. The transition from the significant column display 400 to the combined display 500 is caused by a user interface input that indicates dividing a displayed image into two portions and also specifies where the location of a separation between those two portions. Alternative examples are able to perform the described modify the display and present additional data in response to any input, such as a defined function key, use of user interface devices that specify movements such as mice, trackpads, trackballs, and the like. Examples of a defined key in response to which the displayed image is modified is one or both of the first selection button 212 and the second selection button 214, discussed above with regards to FIG. 2. Trackpad 210 described above with regards to FIG. 2 is another example of a user interface device through which an input is received that indicates horizontal movement of a graphical display element, such as divider bar 404. The following description refers to horizontal and vertical directions in a manner that corresponds to the depictions of previously described FIGS. 3-6. The following process is able to be performed on displays with any orientation and the below references to horizontal and vertical directions are applicable in further examples to any substantially perpendicular dimensions.

The described display transition process 700 includes a description of the transitions from the data table list 300 to the significant column display 400 and also from the significant column display 400 to the combined display 500. It is clear that only one of the transition from the data table list 300 to the significant column display 400 or the transition from the significant column display 400 to the combined display 500 is able to be performed without requiring the below described sequence between these three displays. Once one of these two transitions are performed, the processing is able to transition to another state where different images are presented on a display.

The display transition process 700 begins by receiving, at 702, at least one data table. The data tables are able to be received by, for example, being stored in volatile or non-volatile memory, being received over a communications link from a remote device, or by any technique that delivers the data tables to a processor performing the display transition process 700. Alternatives are able to receive names of data tables that are able to be accessed by a particular device, such as over a communications network.

The display transition process 700 continues by displaying, at 704, a list of available data tables. As discussed above, available data tables are able to be stored on a device performing the display transition process 700 or available through other techniques, such as from a remote location via a data communications network.

The display transition process 700 receives, at 706, an input selecting a selected data table. A user is able to provide an input selecting a selected data table by a defined gesture or other operation of a graphical user interface, by a voice command, by entering a text command, or by any other suitable input through user interface facilities of a device. In one example, the user input facilities of the device receive the user's input and provides data to control further processing by the device.

The display transition process 700 then determines, at 708 in response to receiving the input selecting the selected data table, a significant column within the selected data table. A significant column for a data table is able to be defined by, for example, data that is extrinsic to the data table and that is also either received along with the data tables, or that is otherwise accessible. The identification of a significant column is also able to be performed in further examples by allowing a user to specify the significant column, determining that the significant column is a particular column of the received data tables such as the first column of the data tables, processing of the data tables to identify a likely significant column, or by any other technique. In some examples, the significant column is able to be designated as a most significant column by a creator of the table or other entity.

The display transition process 700 continues by presenting, at 710, the significant column of the selected data table in an image within a display area that spans from a first edge of a display to a second edge of the display, where the first edge is parallel to and opposite the second edge. In one example, the first edge and the second edge correspond to the physical edge of a display of an electronic device. In further examples, the first edge and the second edge are edges of an area of a display, such as a sub-window of a graphical user interface display.

The display transition process 700 further displays, at 712, a divider bar along the first edge of the display. In various examples, the first edge is able to be either a right edge or a left edge of the display area. In some examples, the significant column does not extend to the edge of the display area but rather extends from the second edge to an edge of the divider bar that is opposite the first edge.

The display transition process 700 continues by receiving, at 714, a user interface input indicating movement of the divider bar from the first edge to a new position, where the new position is between the first edge and the second edge. The indicated movement has a component that is perpendicular to the first edge. As discussed above, the user interface input is able to be received in various forms, such as by a gesture on a touchscreen or touchpad, by pressing a defined key or button on a device, by operating a user interface input device, or by any other technique. In one example, the new position is defined in part by a gesture such as swiping a finger across a touchscreen display and defining the new position to be a location where the swipe stops. In another example, the new position is a fixed position defined by the display transition process 700 and any gesture interpreted as a user interface input indicating movement of the divider bar moves the divider bar to that fixed position. In one particular example, a generally horizontal swipe of a finger across a touchscreen display from the right to the left causes the divider bar to be positioned at the fixed position defined by the display transition process 700. In other examples, the new position is defined by other mechanisms.

The display transition process 700 modifies, at 716 in response to receiving the user interface input, the presentation of the significant column to visually compress the significant column between the second edge and the new position of the divider bar. The display transition process 700 also presents, at 718 in response to receiving the user interface input, additional data contained in the table. The additional data is presented between the new position and the first edge and the additional data is presented in rows that are aligned with corresponding rows of the significant column. An example of the modified presentation of the significant column and the additional data is described above with regards to the combined display 500. The display transition process 700 then returns to receiving, at 714, a user interface input as described above.

Figure 8:
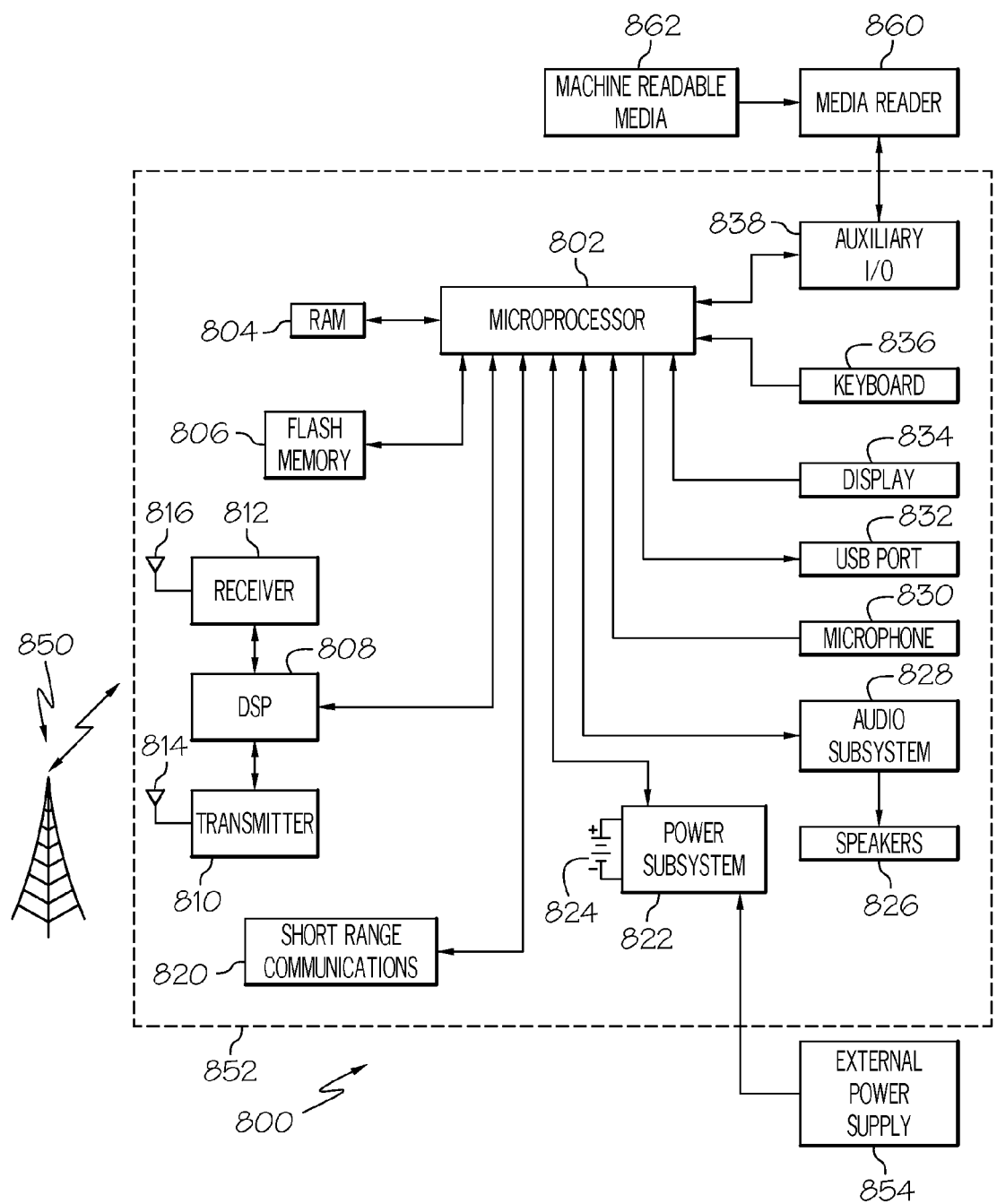
FIG. 8 is a block diagram of an electronic device and associated components in which the systems and methods disclosed herein may be implemented.

FIG. 8 is a block diagram of an electronic device and associated components 800 in which the systems and methods disclosed herein may be implemented. In this example, an electronic device 852 is a wireless two-way communication device that is able to provide one or both of voice and data communication capabilities. Such electronic devices communicate with a wireless voice or data network 850 via any suitable wireless communication protocol or protocols. Wireless voice communication is performed using either analog or digital wireless communication protocols according to the network 850 to which the wireless communication device is connected. Data communication to and from the electronic device 852 support exchanging data with other computer systems through any suitable network, such as the Internet. Examples of electronic devices that are able to incorporate the above described systems and methods include data pagers, data messaging devices, cellular telephones, or a data communication device that may or may not include telephony capabilities.

The illustrated electronic device 852 is an example electronic wireless communication device includes two-way wireless communication components to provide wireless data communication with a wireless data network, a wireless voice network, or both. Such electronic devices incorporate communication subsystem elements such as a wireless transmitter 810, a wireless receiver 812, and associated components such as one or more antenna elements 814 and 816. A digital signal processor (DSP) 808 performs processing to extract data from received wireless signals and to generate signals to be transmitted. The particular design of the communication subsystem is dependent upon the communication network and associated wireless communication protocols with which the device is intended to operate.

Data communication with the electronic device 852 generally includes receiving data, such as a text message or web page download, through the receiver 812 and providing that received data to the microprocessor 802. The microprocessor 802 is then able to further process the received data for output to the display 834 or to other devices such as an auxiliary I/O device 838 or through the Universal Serial Bus (USB) port 832. The electronic device 852 also allows a user to create data items, such as e-mail messages, using the keyboard 836 in conjunction with the display 834 and possibly with data received through an auxiliary I/O device 838. Such composed items are then able to be transmitted over a communication network through the transmitter 810.

The electronic device 852 performs voice communications by providing received signals from the receiver 812 to the audio subsystem 828 for reproduction by speakers 826. A user's voice is able to be converted to electrical signals from microphone 830 for transmission by transmitter 810.

A short-range communication subsystem 820 provides communication between the electronic device 852 and different systems or devices. Examples of short-range communication subsystems 820 include an infrared device and associated circuits and components, or a Radio Frequency based communication subsystem such as a Bluetooth®, Zigbee®, Wi-Fi or Wi-MAX communication subsystem to provide for communication with similarly-enabled systems and devices.

The electronic device 852 includes a microprocessor 802 that controls device operations for the electronic device 852. The microprocessor 802 interacts with the above described communication subsystem elements to implement and control wireless communication with the network 850. The microprocessor 802 further performs control and data exchange functions by interacting with, for example, flash memory 806, random access memory (RAM) 804, auxiliary input/output (I/O) device 838, USB Port 832, display 834, keyboard 836, audio subsystem 828, microphone 830, a short-range communication subsystem 820, a power subsystem 822, and any other device subsystems. In one example, the display 834 is a touchscreen display that is able to receive inputs from a user that correspond to various gestures performed by the user in touching the screen of the display 834.

In one example, microprocessor 802 is a processor that generates, creates, modifies, controls and manages images and other data presented on display 834. The microprocessor 802 further receives user interface device inputs, such as from a keyboard 836, touchscreen display 834, or other types of devices that are not shown in this example.

An internal power pack, such as a battery 824, is connected to a power subsystem 822 to provide power to the circuits of the electronic device 852. The power subsystem 822 includes power distribution circuitry to supply electric power to the various components of the electronic device 852 and also includes battery charging circuitry to support recharging the battery 824. An external power supply 854 is able to be connected to the power subsystem 822. The power subsystem 822 includes a battery monitoring circuit that provide a status of one or more battery conditions, such as remaining capacity, temperature, voltage, current draw, and the like.

The USB port 832 provides data communication between the electronic device 852 and one or more external devices. Data communication through USB port 832 enables various user data, such as data files or configuration parameters for the electronic device 852 to be exchanged between the electronic device 852 and an external device. The USB port 832 is also able to be used to convey external power to the power subsystem 822 from a suitable external power supply.

Operating system software used by the microprocessor 802 is stored in flash memory 806. In addition to, or in place of, flash memory 806, a battery backed-up RAM or other non-volatile storage data elements are able to store operating systems, other executable programs, or both. As an example, a computer executable program configured to perform the display transition process 700, as is described above, is included in a software module stored in flash memory 806.

RAM memory 804 is used to store data produced or used by microprocessor 802. RAM memory is further able to temporarily store program data from flash memory 806 or from other storage locations. RAM 804 is also used to store data received via wireless communication signals or through wired communication.

The microprocessor 802 in some examples executes operating system software as well as various other software applications such as user applications, small, special purpose applications referred to as "apps," and the like. Some software, such as operating system and other basic user functions such as address books are able to be provided as part of the manufacturing process for the electronic device.

In addition to loading applications as part of a manufacturing process, further applications are able to be loaded onto the electronic device 852 through, for example, the wireless network 850, an auxiliary I/O device 838, USB port 832, short-range communication subsystem 820, or any combination of these interfaces. Once these applications are loaded into the electronic device 852, these applications are executed by the microprocessor 802.

A media reader 860 is able to be connected to an auxiliary I/O device 838 to allow, for example, loading computer readable program code of a computer program product into the electronic device 852 for storage into flash memory 806. One example of a media reader 860 is an optical drive such as a CD/DVD drive, which may be used to store data to and read data from a computer readable medium or storage product such as computer readable storage media 862. Examples of suitable computer readable storage media include optical storage media such as a CD or DVD, magnetic media, or any other suitable data storage device. The media reader 860 is alternatively able to be connected to the electronic device through the USB port 832 or computer readable program code is alternatively able to be provided to the electronic device 852 through the wireless network 850.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method of presenting tabular data, comprising:
receiving a data table, the data table comprising data identifying a specific column in the data table as a significant column of the data table,
wherein the significant column comprises data that is more significant in identifying rows of the data table that are of interest to a user;
displaying as a first presentation of data in the data table, in response to receiving the data table, a first image of an initial data set within the data table, the initial data set being shown as a single column in the first image and being limited to data within an initial plurality of rows of the significant column of the data table,
the single column spanning from a divider bar extending along and adjacent to a first edge of a touch screen display to a second edge of the touch screen display,
the first edge being parallel to and opposite the second edge;
presenting the divider bar along the first edge of the touch screen display,
the divider bar having a width comprising two lines separated by a distance,
the divider bar being presented adjacent to all rows of the initial plurality of rows, and
the divider bar being presented adjacent to the first edge and between the first edge of the touch screen display and all rows of initial plurality of rows, and
the divider bar being movable by a touch screen gesture comprising a swipe across the touch screen with a directional component perpendicular to the first edge of the touch screen display and towards the second edge of the touch screen display;
receiving a user interface movement input indicating a movement of the divider bar to a new position that is between the first edge and the second edge, the movement having a component in a first direction that is perpendicular to the first edge;
presenting, in response to receiving the user interface movement input, a second image between the second edge and the new position of the divider bar, the second image comprising a visually compressed presentation of the data within the significant column, the second image being visually compressed along the first direction; and
presenting, between the new position of the divider bar and the first edge, an initial additional presentation depicting data stored in the initial plurality of rows of a first additional column set of the table, the initial additional presentation presenting the initial plurality of rows of the first additional column set in alignment with corresponding rows of the significant column.

2. The method of claim 1, further comprising:
receiving a user selection input indicating the data table; and
determining, based on receiving the user selection input, the significant column of the data table based on the data contained in the data table, and
wherein receiving the data table is based on receiving the user selection input.

3. The method of claim 1, further comprising:
receiving a column scrolling command; and
presenting, based on the column scrolling command, a modified additional presentation between the new position and the first edge, the modified additional presentation depicting data stored in a second additional column set of the initial plurality of rows of the data table, the modified additional presentation presenting the initial plurality of rows in alignment with corresponding rows of the significant column, the second additional column set being selected based upon the column scrolling command and being different than the first additional column set.

4. The method of claim 3, wherein the column scrolling command is received in response to a swipe gesture.

5. The method of claim 3, wherein the column scrolling command is received in response to a swipe gesture made between the new position and the first edge.

6. The method of claim 1, further comprising:
receiving a row scrolling command;
presenting, based upon the row scrolling command, a scrolled second image between the second edge and the new position of the divider bar, the scrolled second image comprising a second plurality of rows of the significant column of the data table, the second plurality of rows being selected based upon the row scrolling command and being different than the initial plurality of rows; and
presenting, based on the row scrolling command, a modified additional presentation between the new position and the first edge, the modified additional presentation depicting data stored in the second plurality of rows of the first additional column set of the data table, the modified additional presentation presenting the second plurality of rows in alignment with corresponding rows of the significant column.

7. A data display apparatus, comprising:
a touch screen display
a processor;
a memory;
a display generator, coupled to the processor and the touch screen display, the display generator configured to:
receive a data table, the data table comprising data identifying a specific column in the data table as a significant column of the data table,
wherein the significant column comprises data that is more significant in identifying rows of the data table that are of interest to a user;
display as a first presentation of data in the data table, in response to receipt of the data table, a first image of an initial data set within the data table, the initial data set being shown as a single column in the first image and being limited to data within an initial plurality of rows of the significant column of the data table, the single column spanning from a divider bar extending along and adjacent to a first edge of the touch screen display to a second edge of the touch screen display, the first edge being parallel to and opposite the second edge;
present the divider bar along the first edge of the touch screen display,
the divider bar having a width comprising two lines separated by a distance, the divider bar being presented adjacent to all rows of the initial plurality of rows, and the divider bar being presented adjacent to the first edge and between the first edge of the touch screen display and all rows of initial plurality of rows, and
the divider bar being movable by a touch screen gesture comprising a swipe across the touch screen with a directional component perpendicular to the first edge of the touch screen display and towards the second edge of the touch screen display;
receive a user interface movement input indicating movement of the divider bar to a new position that is between the first edge and the second edge, the movement having a component in a first direction that is perpendicular to the first edge;
present, in response to reception of the user interface movement input, a second image between the second edge and the new position of the divider bar, the second image comprising a visually compressed presentation of the data within the significant column, the second image being visually compressed along the first direction; and
present, between the new position of the divider bar and the first edge, an initial additional presentation depicting data stored in the initial plurality of rows of a first additional column set of the table, the initial additional presentation presenting the initial plurality of rows of the first additional column set in alignment with corresponding rows of the significant column.

8. The apparatus of claim 7, the display generator further configured to:
receive a user selection input indicating the data table; and
determine a significant column of the data table.

9. The apparatus of claim 7, the display generator further configured to:
receive a column scrolling command; and
present, based on the column scrolling command, a modified additional presentation between the new position and the first edge, the modified additional presentation depicting data stored in a second additional column set of the initial plurality of rows of the data table, the modified additional presentation presenting the initial plurality of rows in alignment with corresponding rows of the significant column, the second additional column set being selected based upon the column scrolling command and being different than the first additional column set.

10. The apparatus of claim 7, the display generator further configured to:
receive a row scrolling command;
present, based upon the row scrolling command, a scrolled second image between the second edge and the new position of the divider bar, the scrolled second image comprising a second plurality of rows of the significant column of the data table, the second plurality of rows being selected based upon the row scrolling command and being different than the initial plurality of rows; and
present, based on the row scrolling command, a modified additional presentation between the new position and the first edge, the modified additional presentation depicting data stored in the second plurality of rows of the first additional column set of the data table, the modified additional presentation presenting the second plurality of rows in alignment with corresponding rows of the significant column.

11. A non-transient computer readable storage medium having computer readable program code for presenting tabular data embodied therewith, the computer readable program code comprising instructions for:
receiving a data table, the data table comprising data identifying a specific column in the data table as a significant column of the data table,
wherein the significant column comprises data that is more significant in identifying rows of the data table that are of interest to a user;
displaying as a first presentation of data in the data table, in response to receiving the data table, a first image of an initial data set within the data table, the initial data set being shown as a single column in the first image and being limited to data within an initial plurality of rows of the significant column of the data table, the single column spanning from a divider bar extending along and adjacent to a first edge of a touch screen display to a second edge of the touch screen display, the first edge being parallel to and opposite the second edge;

presenting the divider bar along the first edge of the touch screen display,
- the divider bar having a width comprising two lines separated by a distance, the divider bar being presented adjacent to all rows of the initial plurality of rows, and the divider bar being presented adjacent to the first edge and between the first edge of the touch screen display and all rows of initial plurality of rows, and
- the divider bar being movable by a touch screen gesture comprising a swipe across the touch screen with a directional component perpendicular to the first edge of the touch screen display and towards the second edge of the touch screen display;

receiving a user interface movement input indicating movement of the divider bar to a new position that is between the first edge and the second edge, the movement having a component in a first direction that is perpendicular to the first edge;

presenting, in response to receiving the user interface movement input, a second image between the second edge and the new position of the divider bar, the second image comprising a visually compressed presentation of the data within the significant column, the second image being visually compressed along the first direction; and presenting, between the new position of the divider bar and the first edge, an initial additional presentation depicting data stored in the initial plurality of rows of a first additional column set of the table, the initial additional presentation presenting the initial plurality of rows of the first additional column set in alignment with corresponding rows of the significant column.

12. The non-transient computer readable storage medium of claim 11, further comprising:
receiving a column scrolling command; and
presenting, based on the column scrolling command, a modified additional presentation between the new position and the first edge, the modified additional presentation depicting data stored in a second additional column set of the initial plurality of rows of the data table, the modified additional presentation presenting the initial plurality of rows in alignment with corresponding rows of the significant column, the second additional column set being selected based upon the column scrolling command and being different than the first additional column set.

13. The non-transient computer readable storage medium of claim 11, further comprising:
receiving a row scrolling command;
presenting, based upon the row scrolling command, a scrolled second image between the second edge and the new position of the divider bar, the scrolled second image comprising a second plurality of rows of the significant column of the data table, the second plurality of rows being selected based upon the row scrolling command and being different than the initial plurality of rows; and
presenting, based on the row scrolling command, a modified additional presentation between the new position and the first edge, the modified additional presentation depicting data stored in the second plurality of rows of the first additional column set of the data table, the modified additional presentation presenting the second plurality of rows in alignment with corresponding rows of the significant column.

14. The method of claim 1, the divider bar being moved by a generalized swipe across the touch screen display, the receiving the user interface movement comprising receiving the generalized swipe across the touch screen display while the divider bar is presented along the second edge of the touch screen display.

15. The method of claim 14, wherein the divider bar is moved to the new position based on the generalized swipe across the touch screen display, and wherein the new position, based on the generalized swipe, is a defined fixed position, the defined fixed position being independent of an end position of the generalized swipe, and the new position separating the second image and the initial additional presentation.

16. The method of claim 1, the divider bar comprising a continually present divider bar handle that is located at a location that is within the divider bar and away from either edge of the divider bar that is perpendicular to the two lines of the divider bar.

17. The method of claim 16, wherein the location of the divider bar handle is at a middle of the divider bar along a direction parallel to the two lines separated by the distance.

18. The method of claim 16, wherein receiving the user interface movement input comprises receiving a touch at the divider bar handle that comprises a swipe of the touch in a direction perpendicular to the second edge.

19. The method of claim 18, wherein the new position is a fixed position independent of an end position of the swipe, and the new position separating the second image and the initial additional presentation.

* * * * *